(12) United States Patent
Kumar et al.

(10) Patent No.: US 6,186,705 B1
(45) Date of Patent: Feb. 13, 2001

(54) CUTTING INSERT WITH CHIP CONTROL

(75) Inventors: Sumanth Kumar, Rockford; William B. Johnson, Loves Park; Linda E. Wilken, Roscoe; Brian D. Hoefler, Rockford, all of IL (US)

(73) Assignee: Ingersoll Cutting Tool Company, Rockford, IL (US)

( * ) Notice: Under 35 U.S.C. 154(b), the term of this patent shall be extended for 0 days.

(21) Appl. No.: 09/458,888

(22) Filed: Dec. 10, 1999

Related U.S. Application Data

(63) Continuation of application No. 09/256,514, filed on Feb. 23, 1999, now abandoned.

(51) Int. Cl.⁷ .................... B23D 1/00; B23C 5/20
(52) U.S. Cl. ................. 407/114; 407/115; 407/116
(58) Field of Search ........................... 407/113, 114, 407/115, 116

(56) References Cited

U.S. PATENT DOCUMENTS

| | | |
|---|---|---|
| 3,973,308 | 8/1976 | Lundgren . |
| 4,044,439 | 8/1977 | Romagnolo . |
| 4,215,957 * | 8/1980 | Holma et al. .................... 407/114 |
| 4,344,725 * | 8/1982 | Seidel ............................ 407/114 |
| 4,411,565 * | 10/1983 | Hazra et al. .................... 407/114 |
| 4,447,175 | 5/1984 | Warren . |
| 4,880,338 | 11/1989 | Stashko . |
| 4,934,879 | 6/1990 | van Barneveld . |
| 4,941,780 | 7/1990 | Takahashi . |
| 4,988,242 | 1/1991 | Pettersson et al. . |
| 5,205,680 | 4/1993 | Lindstedt . |
| 5,282,703 | 2/1994 | Itaba et al. . |
| 5,538,367 | 7/1996 | Ashley et al. . |
| 5,584,616 | 12/1996 | Katbi et al. . |
| 5,599,141 | 2/1997 | Katbi et al. . |
| 5,630,681 | 5/1997 | Paya . |
| 5,634,745 | 6/1997 | Wiman et al. . |
| 5,660,507 | 8/1997 | Paya . |
| 5,688,081 | 11/1997 | Paya . |
| 5,702,210 | 12/1997 | Boianjiu . |
| 5,704,734 | 1/1998 | Ashley et al. . |
| 5,725,334 | 3/1998 | Paya . |
| 5,743,681 | 4/1998 | Wiman et al. . |
| 5,791,833 | 8/1998 | Niebauer . |
| 5,876,154 | 3/1999 | Enderle . |

* cited by examiner

Primary Examiner—Henry W.H. Tsai
(74) Attorney, Agent, or Firm—Fitch, Even, Tabin & Flannery

(57) ABSTRACT

The cutting insert disclosed is a block of hard metal configured on at least one of its major faces to provide peripheral cutting edges successively index able about a central fastener location to position each edge serial for cutting. The major face slopes downwardly and inwardly from the cutting edges to provide rake surfaces of positive rake behind the cutting edges, and then rises as a sloping ledge to a central boss. A series of depressions disposed along the rake surface produce a ribbed chip which breaks more readily, and into smaller chips, easier to flush or otherwise remove from the cutting site.

6 Claims, 1 Drawing Sheet

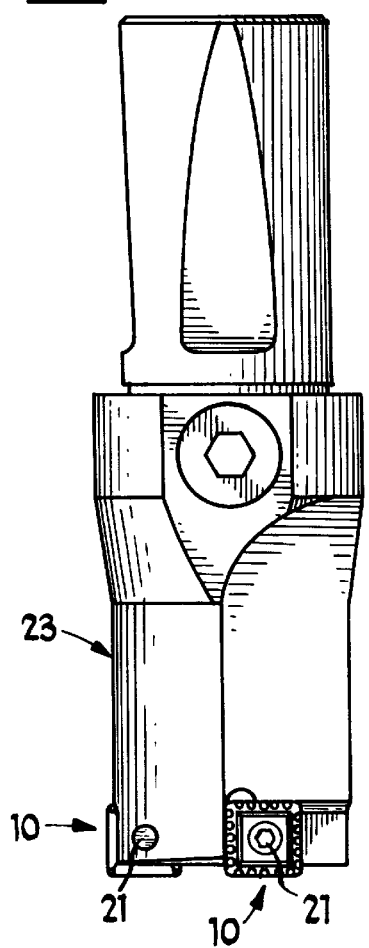
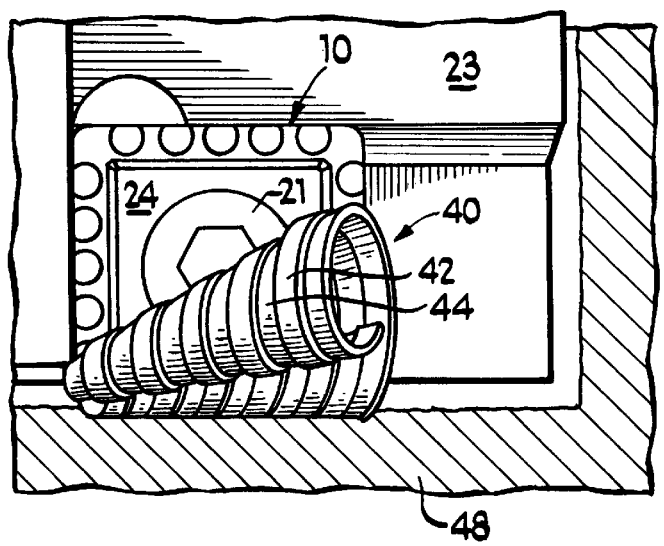
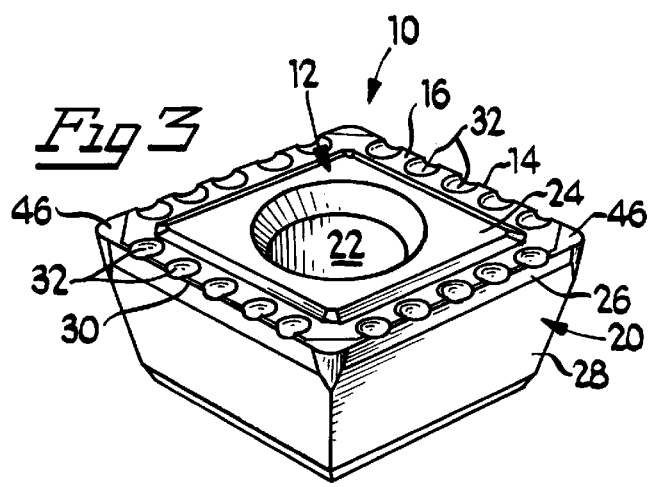
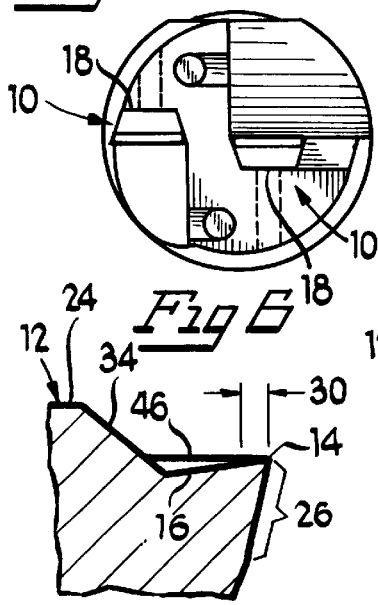
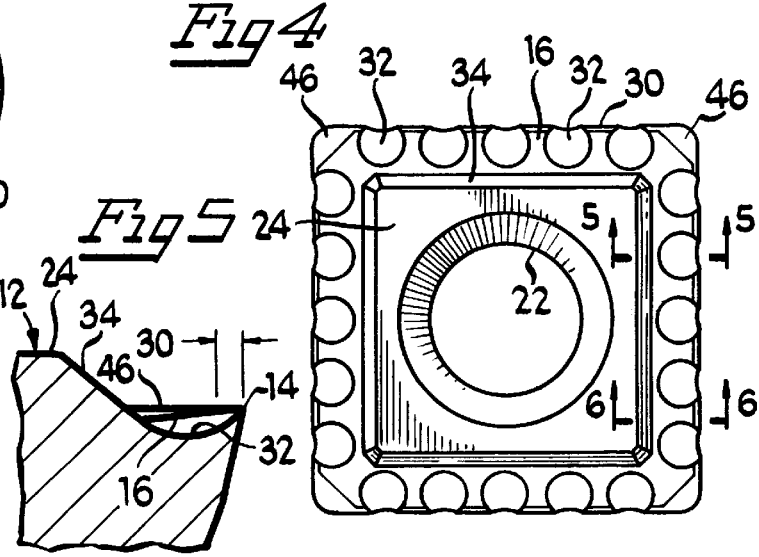
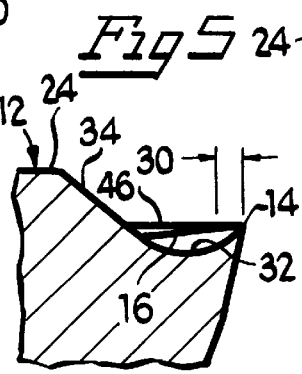

CUTTING INSERT WITH CHIP CONTROL

CROSS-REFERENCE TO RELATED APPLICATION

This application is a continuation of prior application Ser. No. 09/256,514, filed Feb. 23, 1999, now abandoned, which is hereby incorporated herein by reference in its entirety.

FIELD OF THE INVENTION

The invention disclosed and claimed relates generally to index able hard metal cutting inserts for ductile metals. In particular, it concerns the configuration of the rake face of the insert to cut a chip from a workpiece of ductile material in a manner such as to cause the curling chip to break off in a short curl over a practical working range of feed rates, i.e., chips both thin and thick, to facilitate their ready removal from the cutting site.

BACKGROUND OF THE INVENTION

In general, the interruption of the rake face of cutting inserts with laterally spaced depressions in the chip path from the cutting edge has been appreciated for its ability to render chips removed from ductile work material more readily breakable. The effect of properly placed depressions is to produce longitudinal ridges in the chip while it remains in a somewhat plastic state due to the high temperature produced by the velocity of the forceable shearing of the chip from the workpiece. The ridges, in turn, stiffen the chip against bending and hasten the attainment of a sufficiently high level of bending stress or strain at a point in the chip remote from the cutting site to cause it to break off.

The effect varies with the flow properties of the material, and with the cutting speed and feed rate, which influence the strain rate and heat generated in the chip as well as determining its thickness.

The object of this invention is the provision of an insert, suitable for use in drills and other applications, that will break chips of ductile materials into short lengths over a practical working range of feed rates and chip thicknesses.

SUMMARY OF THE INVENTION

The cutting insert of the invention provides a rake surface of positive inclination when mounted in a drill body. The rake surface recedes from the cutting edge to a sloped ledge of significant height, while the rake surface proper between the cutting edge and the ledge is interrupted by a series of spaced depressions along and adjacent to the cutting edge in the path of chip flow. The depressions serve to corrugate and curl a chip thin enough to follow their contour as it emerges from the cutting edge, while the ledge behind them serves to curl thicker chips which are stiff enough to override the depressions.

BRIEF DESCRIPTION OF THE DRAWINGS

The invention is explained in the following description of a preferred embodiment shown in the following drawings, in which:

FIG. 1 is an elevational view of a drill employing the cutting insert of the invention;

FIG. 2 is a bottom end view thereof;

FIG. 3 is an enlarged isometric view of the insert;

FIG. 4 is a plan view of the same;

FIGS. 5 and 6 are fragmentary sectional views of the insert taken on the lines 5—5 and 6—6 of FIG. 4, respectively; and FIG. 7 is an enlarged fragmentary elevation of the drill of FIG. 1, in the process of generating the corrugated form of chip produced by the insert of the invention.

DETAILED DESCRIPTION OF THE PREFERRED EMBODIMENT

Referring initially to FIGS. 3 to 6 of the drawings, the cutting insert 10 of the invention in preferred form is a modified parallelepiped, namely a square block having two major faces, an upper or front face 12 configured to provide the peripheral cutting edges 14 and the associated rake surfaces 16, and a parallel plane seating face 18, both bounded by identical sloping, minor side surfaces 20. The insert is pierced by a central hole 22 on an axis perpendicular to the major faces 12 and 18.

The upper or front face 12 of the insert recedes from peripheral cutting edges 14 as the downwardly sloping rake surfaces 16, and then rises as a sloping surface at approximately forty-five degrees (45°) to the plane of an elevated central boss 24 from which the central hole 22 is countersunk to seat the customary screw 21 to secure the insert in a suitable pocket in a fluted drill body 23. The downward and inward slope of the rake surface 16 (FIGS. 5 and 6) provides positive rake with respect to the planar boss 24 and the parallel seating surface 18.

The identical minor side surfaces 20 of the block taper inwardly from the periphery of the upper major face of the insert to the lower seating face 18. This taper proceeds in two steps, a narrow upper band 26, at a smaller angle to a perpendicular to the lower face, and a broader band 28 at a somewhat greater angle to that perpendicular. The intersections of the side and bottom surfaces of the insert are relieved by a slight chamfer. The narrow band 26 and the broader band 28 serve respectively as primary and secondary clearance surfaces for the cutting edges 14 of the insert on the periphery of its upper major face 12.

In the preferred form illustrated, each cutting edge 14, formed at the intersection of the narrow band 26 of the side surface and the receding upper rake surfaces 16 of the insert, is essentially linear, and may be slightly blunted by a cutting edge land 30.

Behind each cutting edge 14 is a series of depressions, or "dimples", 32 in the rake surface 16, five behind each cutting edge in the illustrated case. These depressions in preferred form are spherical, their spacing being derived as though a line of imaginary tangent contacting spheres of equal size had been impressed into the rake surface 16 to a depth of forty percent of the spherical radius, sufficient to crater the rake surface from the cutting edge 14 to the base of the upwardly sloping peripheral ledge surfaces 34 of the elevated central boss 24 on the upper major surface 12 of the insert In terms of relative dimensions, the depressions 32 occupy approximately forty percent of the area of each rake surface 16. The height of said ledge surfaces relative to the cutting edge is at least as great as the depth of the depressions relative to the cutting edges.

The spaced spherical depressions 32 of the receding peripheral rake surface 16 of the upper major face 12, transform that peripheral surface into a composite rake surface of varying rake angle along the cutting edge 14, with a greater positive rake angle in the depressions 32 (FIG. 5) than in the residual rake surfaces 16 between them (FIG. 6). The result is the formation of a chip 40 (FIG. 7) which is corrugated or ribbed, with the ribs 42 between adjacent flutes 44 formed by the residual rake surfaces between the depressions.

At the four corners of the insert 10, the junctures of the several peripheral cutting edges 14 are rounded off, and the immediately adjacent corner rake surface 46, distinguished from the positive rake surfaces 16 by its relatively neutral rake angle, strengthens the cutting edge at the corner. That feature is conventional practice rather than a novel aspect of the invention. When used for drilling, it benefits the radially innermost insert particularly, upon which the relatively lower cutting speeds result in greater cutting-force reaction.

Typically, two such inserts are mounted in the drill body 23 (FIG. 1) so as to sweep overlapping cutting paths as the drill is fed into a workpiece, 48 (FIG. 7). FIG. 7 shows a chip 40 being formed by the insert nearer the center of rotation, where the cutting speed is zero at the center of rotation and increases linearly along the cutting edge, resulting in a distinctly conical chip 40.

When the feed of the drill 23 into the workpiece 48 is light, say of the order of a cutting depth of six thousandths inches, the chip tends to follow the curvature of the depressions 32 in the rake surface 16, and to curl readily as it passes through those depressions.

Under conditions of higher feed rates, say at ten thousandths inches or greater, the thicker chip tends to pass over the depressions 32 of the rake face with little conforming thereto. Such thicker chips strike the sloping ledge 34 of the central boss 24 standing as a continuous barrier to the progress of the chip and deflecting it away from the rake surface. The resulting bending effect upon the chip, in its hot and relative plastic state upon being progressively sheared from the workpiece, causes the thicker chip to curl as well, although typically not as tightly as the thinner chip of lighter feed.

The ribbed effect of the composite rake surface upon the chip is produced in chips both thin and thick, and promotes the breakage of the chip sooner than would be the case with a continuous uninterrupted rake surface from end to end of the cutting edge. The time required for a ribbed chip to reach ultimate material strain is less than for an unbarbed chip, resulting in smaller chip curls, i.e., fewer turns, than with an unbarbed, non fluted chip.

For example, at a feed of 0.006" per revolution of the drill, the ribbed chip produced by the composite or "dimpled" rake surface broke off after one-and-one-half convolutions, typically, of its conical helix configuration, whereas those produced by an otherwise identical insert of the same size operated at the same speed and feed, but having no dimples, typically produced a chip of more than three turns of the conical helix before breaking off.

The consistently smaller chips produced by the insert of the invention are more easily flushed from the hole by the cutting liquid issuing from the tip of the drill, greatly reducing the incidence of the jamming of the drill from failure to break off the chip for easy removal.

The preferred embodiment, illustrated as an essentially square block, is preferred for its ruggedness in the drilling context, as well as for the multiple cutting edges it provides, as the insert is successively indexed about the axis of its central hole 22 to present each of the cutting edges in the active position as its predecessor, wears to an unacceptable degree, reflected usually by excess power consumption. However, it is also feasible to press the insert in double-sided configuration providing eight cutting edges in a square-block insert, and wherein the central boss 24, duplicated on the reverse side of the insert, becomes the seating surface of the insert in the alternate position which presents the identical cutting edges of the opposite face for cutting service. Heeling clearance behind the cutting edges of both faces, in such cases, requires a more forward leaning attitude of the active face of the insert, which may to some extent be compensated by a larger positive rake angle of the peripheral rake surfaces 16 of both faces of the insert.

Those skilled in this art will recognize that the principles illustrated and explained are adaptable as well to other polygonal shapes, and to other cutting applications.

The features of the invention believed new and patent able are set forth in the following claims.

What is claimed is:

1. A cutting insert comprising:

a block of hard metal cutting material having a first major plane face, having a depressed edge portion which constitutes a rake surface, a second major plane face parallel to said first-mentioned major face and defining a seating surface for said insert, and a minor face intersecting both major faces to define a cutting edge along said rake surface and a clearance face extending from said cutting edge to said seating surface, said rake surface sloping inwardly from said cutting edge toward said seating surface to make a positive rake angle with respect to said seating surface, said rake surface receding from said cutting edge to a ledge on said block rising above said rake surface and cutting edge as an uninterrupted barrier parallel to said cutting edge, said rake surface having therein a series of spaced depressions along and adjacent to said cutting edge and shaped to increase said positive rake angle within said depressions, said depressions extending away from said cutting edge toward said ledge for a major portion of the rake surface and each providing an upwardly sloped surface therein remote from said cutting edge and terminating in front of said ledge, said ledge receding upwardly and rearwardly from said rake surface so as to deflect a chip of rigidity sufficient to override said depressions, the height of said ledge relative to said cutting edge being at least as great as the depth of said depressions relative to said edge.

2. The cutting insert of claim 1 wherein said receding ledge and said rake surface between said depressions are planar.

3. The cutting insert of claim 1 wherein said depressions are spherical sectors and occupy approximately forty percent of said rake surface.

4. The insert of claim 2 wherein said depressions are spherical sectors of imaginary touching spheres of equal radius and have a depth into said rake surface of approximately forty percent of said radius.

5. The cutting insert of claims 1, 2, 3, or 4 having multiple indexable cutting edges, wherein said minor face is one of multiple minor plane surfaces of equal size and shape having the same angle relative to said first major face so as to provide multiple identical cutting edges of equal width having identical peripheral rake surfaces, depressions, and ledges associated therewith, said ledges constituting the perimeter of a polygonal boss central to said first major face, said boss having a central depression therein to receive a fastener for securing the insert to the body of a drill, said multiple cutting edges being indexable serial into cutting position by rotation of the insert on an axis through the center of said central depression perpendicular to said seating surface, one or more of said minor surfaces when not serving as clearance faces constituting positioning surfaces for the insert in the body of the drill.

6. The insert of claim 5 wherein the cutting edges are four in number on a block substantially of parallelepiped shape.

* * * * *

UNITED STATES PATENT AND TRADEMARK OFFICE
CERTIFICATE OF CORRECTION

PATENT NO. : 6,186,705 B1
DATED : February 13, 2001
INVENTOR(S) : Sumanth Kumar et al.

Page 1 of 1

It is certified that error appears in the above-identified patent and that said Letters Patent is hereby corrected as shown below:

Title page, item [57],
Abstract,
Line 3, change "index able" to -- indexable --.
Line 4, change "serial" to -- seriatim --.

Column 1,
Line 11, change "index able" to -- indexable --.

Column 2,
Line 53, after "insert" insert a period.

Column 5,
Line 5, change "serial" to -- seriatim --.

Signed and Sealed this

Second Day of October, 2001

Attest:

*Nicholas P. Godici*

NICHOLAS P. GODICI
*Attesting Officer*     *Acting Director of the United States Patent and Trademark Office*